US006530002B1

(12) United States Patent
Martin et al.

(10) Patent No.: US 6,530,002 B1
(45) Date of Patent: \*Mar. 4, 2003

(54) METHOD AND APPARATUS FOR MULTIPLE DISK DRIVE ACCESS IN A MULTI-PROCESSOR/MULTI-DISK DRIVE SYSTEM

(76) Inventors: Brian James Martin, 134 Whitmarsh Ave., Worcester, MA (US) 01601;
George Garfield Peters, 23 Oakhurst Rd., Hopkinton, MA (US) 01748;
Michael Scott Ryan, 2032 W. Club Blvd., Durham, NC (US) 27701

( * ) Notice: Subject to any disclaimer, the term of this patent is extended or adjusted under 35 U.S.C. 154(b) by 0 days.

This patent is subject to a terminal disclaimer.

(21) Appl. No.: 09/920,169

(22) Filed: Aug. 1, 2001

Related U.S. Application Data

(63) Continuation of application No. 09/390,012, filed on Sep. 3, 1999, now Pat. No. 6,295,587.

(51) Int. Cl.[7] .............................................. G06F 13/14
(52) U.S. Cl. ...................................................... 711/154
(58) Field of Search ....................... 711/111, 112, 114, 711/154; 710/9, 131, 132

(56) References Cited

U.S. PATENT DOCUMENTS

| | | | | |
|---|---|---|---|---|
| 4,494,215 A | * | 1/1985 | Koike et al. | 364/900 |
| 5,765,183 A | * | 6/1998 | Kojima et al. | 711/114 |
| 5,768,623 A | * | 6/1998 | Judd et al. | 395/857 |
| 5,809,285 A | * | 9/1998 | Hilland | 395/500 |
| 5,819,310 A | * | 10/1998 | Vishlitehy et al. | 711/114 |

\* cited by examiner

*Primary Examiner*—Kevin L. Ellis
(74) *Attorney, Agent, or Firm*—Davis & Bujold, P.L.L.C.

(57) ABSTRACT

An improved method and apparatus for providing access between the processors and the mass storage devices of a computer system wherein an interprocessor bus interconnects the processors and adapters are connected from the interprocessor bus for communication between the processors and the mass storage devices and the system includes binding utility for communicating with the processors and the adapters to generate pairings between the processors and the adapters. A switch is connected between the adapters and the mass storage devices for connecting each adapter to each mass storage device and a binding mapper operates with the binding utility at each binding of a processor/adapter pair to enumerate the mass storage devices with which a processor/adapter pair is to communicate and determines a mass storage identifier by which the processor identifies the mass storage device. An address mapper references the binding mapper to construct and store an address map having processor set for each mass storage device. Each processor set includes an address map entry for each processor and is indexed by processor number. Each entry contains the mass storage device identifier corresponding to the optimal path of access to the corresponding mass storage device. The address mapper responds to each request for access to a mass storage device by providing the corresponding address map entry and the processor completes the access by directing the request through its paired disk device adapter as determined by the returned address map entry.

4 Claims, 2 Drawing Sheets

MP/MDD SYSTEM 10

METHOD AND APPARATUS FOR MULTIPLE DISK DRIVE ACCESS IN A MULTI-PROCESSOR/MULTI-DISK DRIVE SYSTEM

This application is a continuation of U.S. application Ser. No. 09/390,012, now U.S. Pat. No. 6,295,387, filed Sep. 3, 1999.

FIELD OF THE INVENTION

The present invention relates to a method and apparatus for establishing and controlling disk drive access by processors in a computer system and, in particular, to an improved method for establishing and controlling access to multiple disk devices by multiple processors in a multi-processor/multi-disk drive system.

BACKGROUND OF THE INVENTION

Many current computer systems employ a multi-processor configuration comprised of two or more processor units interconnected by a bus system and capable of independent or cooperative operation, thereby increasing the total system processing capability and allowing the concurrent execution of multiple related or separate tasks by assigning each task to one or more processor. Such systems typically also include a plurality of mass storage units, such as disk drive devices, to provide adequate storage capacity for the number of tasks executing on the system, to reduce the average access latency by spreading the information across multiple disk devices, and to minimize interference between tasks in accessing the mass storage units by assigning, in so far as possible, portions of a disk device or a set of disk devices to each currently active task or processor on the system.

A recurring problem with multi-processor/multi-disk device systems, however, is in reducing communication interference between the processors and the mass storage units. This problem becomes particularly acute when, for example, the tasks concurrently executing on the system must share data, as when one task must provide data to another task, or when two or more concurrent tasks must share the storage space of a disk device unit because of storage space limitations or access latency limitations.

For example, in current NUMA multi-processor/multi-disk device systems each disk device is associated with and connected from a specific subset of processors, or processor complex, through an adapter associated with the processor complex and the processor complexes communicated through a relatively slow inter-processor bus. As such, a read or write operation by a task to any disk device other than a disk device connected to the task's own processor was performed through the inter-processor bus and handled as an interrupt by the processor of the target disk device unit, resulting in a significant loss of speed.

This problem is partially solved in a multi-processor/multi-disk device system, wherein each processor complex and its associated adapter was connected to all the disk devices, often but not necessarily through a switch. Each processor complex could therefore communicate directly with each disk device, so that processor/disk device communications were not required to pass through the inter-processor bus. The processor operating system programs, however, typically identified each disk device associated with a processor by a "name" and, while the names were unique within the context of each processor complex, each disk device would have multiple names in the processor's operating system programs. This would lead the operating system programs to believe there were more disk devices than actually existed, and could result in corruption of the disk data as the operating system programs would treat the different "names" as separate disk devices. As a consequence, an additional operating system program was used to translate local disk device names into "global" disk devices names such that all higher level programs would see one and only one "name" for each actual disk device.

In current multi-processor/multi-disk device systems, such as the quad processor Intel™O SMP system, multiple processors are interconnected through a high speed bus and each disk device adapter is connected between the associated disk device and the bus, rather than to the processors or to an individual processor. These systems eliminate the lower speed interprocessor bus problem and allow each processor to directly address each adapter and its associated disk device through the interprocessor bus without requiring connections from all adapters to all disk devices. The disadvantage to such systems, however, is that each processor typically includes a cache and, because each processor can communicate with each disk device, each cache is required to contain information pertaining to all of the adapters/disk devices. In normal operation, therefore, a significant proportion of the processor and inter-processor bus capacity is consumed with cache update operations as the adapter/disk device information is accessed and updated by many different processors.

Many systems, however, such as the Intel quad processor SMP server system, can reduce the number of cache updates by means of a system utility that allows each processor to be bound to and service interrupts for only a single disk device adapter. Such utilities, while reducing the cache update traffic on the completion of the disk operation, that is, the interrupt processing, do not restrict the initiation of disk operations. The initiation of disk operations can, therefore, result in interprocessor cache traffic. Additional utilities, which allow the construction of dedicated processor/disk device pairs for the initiation of disk operations would significantly reduce the volume of cache update operations because each processor is required to maintain cache information with respect to only one disk device or set of disk devices. This approach has the obvious disadvantage, however, of constraining each processor to accessing only a single disk device or set of disk devices, so that the sharing of data or of disk device space among processors requires complex operations among the processors.

While a switch may be incorporated into such a system to allow each disk device adapter to be connected to a plurality of disk devices and a corresponding plurality of processor/disk device adapter pair assignments to be made for each processor, this method of overcoming the single processor/single disk device limitation is unsatisfactory because of the resulting problems in disk device identification and, consequently, in managing the contents of each disk device and processor cache. In a system having four processors, four disk device adapters, and four disk devices, for example, where each disk device was directly accessible to each of the four disk device adapters, and hence all processors, each disk device would be identified by four names, each of which would be optimal only to a single processor. Additional steps must be taken to ensure that data written to one disk device, through any of its paths or names, is consistent. It is therefore apparent that the inclusion of a switch to enable each disk device to be associated with a plurality of disk devices significantly increases the complexity of managing the contents of the disk devices and the processor caches and greatly increases the possibilities for error.

The present invention provides a solution to these and other problems of the prior art.

SUMMARY OF THE INVENTION

The present invention is directed to an improved method and apparatus for providing access between the processors and the mass storage devices of a computer system having a plurality of processors and a plurality of mass storage devices, an interprocessor bus interconnecting the processors, and a plurality of adapters connected from the interprocessor bus for providing communication between the processors and the mass storage devices. The system will also include a binding utility for communicating with the processors and the adapters to generate pairings between the processors and the adapters wherein each processor/adapter pairing is an association of a processor with an adapter.

According to the present invention, a switch is connected between the adapters and the mass storage devices for connecting each adapter to each mass storage device. A binding mapper communicates and operates with the binding utility at each binding of the adapters and the processors and, at each binding of a processor/adapter pair, enumerates the connected mass storage devices with which the processor of the processor/adapter pair is to communicate and determines, for each such mass storage device, a mass storage identifier by which the processor identifies the mass storage device.

An address mapper is incorporated into the operating system device driver stack and references the binding mapper to construct and store an address map. The address map contains a processor set for each mass storage device wherein each processor set includes an address map entry for each processor in the system. Each processor set is indexed by processor number and contains the mass storage device identifier corresponding to the optimal path of access to the corresponding mass storage device.

Thereafter, the address mapper responds to each request for access to a mass storage device by a processor, wherein the request includes a processor name, by providing the corresponding address map entry from the processor set corresponding to the requesting processor. The processor then completes the access to the mass storage device by directing the request through its paired disk device adapter, as determined by the returned address map entry.

DESCRIPTION OF THE DRAWINGS

The foregoing and other objects, features and advantages of the present invention will be apparent from the following description of the invention and embodiments thereof, as illustrated in the accompanying figures, wherein.

DESCRIPTION OF THE INVENTION

Figure 1:
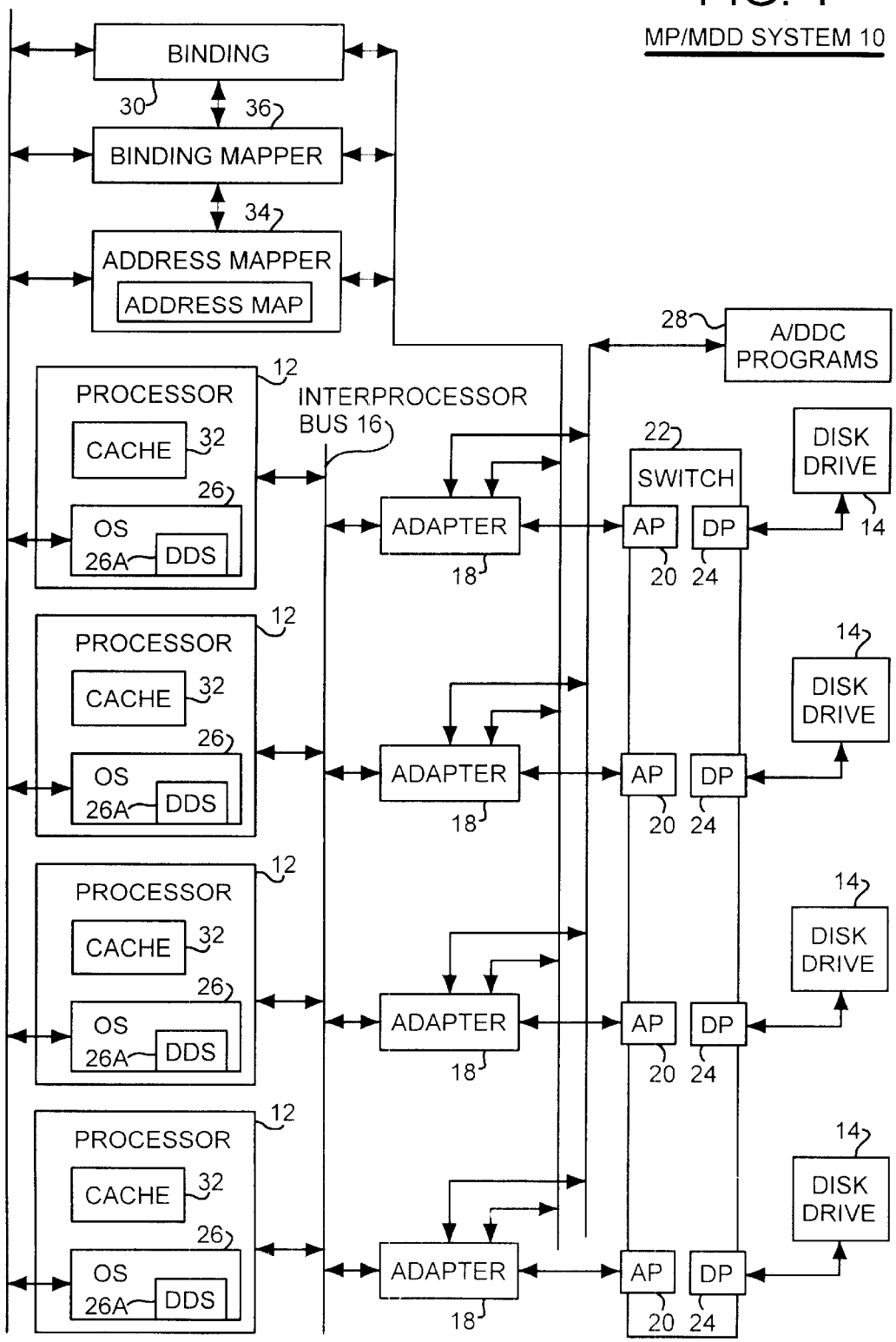
FIG. 1 is a block diagram of a multi-processor/multi-disk device system incorporating the present invention; and, FIG. 2 is a diagrammatic representation of an address map constructed according to the present invention.

Referring to FIG. 1, therein is shown a block diagram of an exemplary Multi-Processor/Multi-Disk Device (MP/MDD) System 10 in which the present invention is implemented. As illustrated therein, MP/MDD System 10 includes a plurality of Processors 12 and a plurality of Disk Devices 14. Processors 12 are interconnected through an Interprocessor Bus 16 and a plurality of Drive Adapters (Adapters) 18 are connected between Interprocessor Bus 16 and a corresponding number of Adapter Ports (APs) 20 of a Disk Device Switch (Switch) 22. Drive Ports (DPs) 24 of Switch 22 are in turn connected to the input/output ports of Disk Devices 14 and Switch 22 operates to selectively connect any of Disk Devices 14 to any of Adapters 18 in any combination of AP 20/DP 24 pairs.

In an exemplary implementation of an MP/MDD System 10, Processors 12 and Interprocessor Bus 16 may be the processors and interprocessor bus of, for example, an Intel SMP quad processor server system, so that the system illustrated in FIG. 1 includes four Processors 12. The basic functions of Processors 12 and Interprocessor Bus 16 are controlled by an Operating System (OS) 26 which may be comprised, for example, of the Microsoft Windows/NT™O operating system, and which contains a Device Driver Stack (DDS) 26A.

Switch 22 may be comprised of a hardware fiber channel switch, as are commonly available from a number of vendors, and Adapters 18 and Disk Devices 14 may be provided from any suitable vendor of such products and controlled by Adapter/Disk Device Control Programs (A/DDC) 28 provided by such vendors for controlling these elements of the system. In the present example as illustrated in FIG. 1, the MP/MDD System 10 includes four Disk Devices 14 and four Adapters 18 and Switch 22 is correspondingly provided with four APs 20 and four DPs 24. Switch 22 can thereby establish 16 different connections between Adapter 18/Disk Device 14 pairs. Four such Adapter 18/Disk Device 14 connections may be active at any given time, subject only to the restriction that the Adapter 18/Disk Device 14 connections in any such set of four connections must be exclusive, that is, that no Adapter 18 or Disk Device 14 may be used more than once in any set of four Adapter 18/Disk Device 18 connections.

As indicated in FIG. 1, a Binding Utility (Binding) 30 communicates with OS 26 and Processors 12 and with Adapters 18 and operates to generate pairings between Processors 12 and Adapters 18 wherein each pairing is an association of one of Processors 12 with one of Adapters 18. In a typical implementation of the present invention, Binding 30 may be, for example, the interrupt/bind utility normally provided by Intel for the Intel SMP quad processor server system and will operate in its normal, designed manner to generate Processor 12/Adapter 18 pairings.

In the exemplary MP/MDD System 10 of the present invention as illustrated in FIG. 1, Switch 22 is employed to connect each of Adapters 18 with any of Disk Devices 14, so that each Adapter 18, and thereby the Processor 12 with which it is paired, may thereby be connected any of Disk Devices 14. The operation of Switch 22 thereby transforms each binding of a Processor 12 to a corresponding single Adapter 18 by Binding 30 into the binding of each Processor 12 to each of Disk Devices 14 where the Disk Device 14 that is bound to a given Processor 12 at any given time depends on the state of Switch 22 at that time. In the exemplary MP/MDD System 10 shown in FIG. 1, therefore, the four Processor 12/Adapter 18 bindings performed by Binding 30 are functionally transformed into 16 Processor 12/Disk Device 14 bindings. It will be understood that in the present example up to four Processor 12/Disk Device 14 bindings may be active at any given time, this being the number of Adapters 18 and the number of possible concurrent active connections through Switch 22.

It will be understood, moreover, that a typical Binding 30 as provided, for example, with an Intel SMP quad processor server system, is designed to operate in a system that does not include a Switch 22 and, accordingly, operates to associate each Processor 12 only with a single Adapter 18. As such, a Binding 30 will typically not recognize nor execute a binding between a Processor 12 and a plurality of Disk Devices 14, but will establish bindings only between each Processor 12 and a corresponding single Adapter 18. It will be further understood that, as described previously, each Processor 12 identifies each of Disk Devices 14 to which it has access by a "name" that is optimal only within the context of that Processor 12's operating environment. In the present exemplary system shown in FIG. 1, for example, there will be a total of 16 disk device "names", that is, four "names" for each of the four Processors 12. Of these 16 "names", only one exclusive set of four "names" will be optimal within the context of a given Processor 12 and all other "names" will be undesirable within the context of that Processor 12. It will also be recognized that these two problems, that is, of single Processor 12/Adapter 18 bindings by Binding 30 and of translating between Disk Device 14 "names" as recognized by Processors 12 and correct identifications of the corresponding actual Disk Devices 14, are related. That is, a Binding 30 typically operates to bind a Processor 12 to a given Adapter 18 and to allow the Processor 12 to identify a single Disk Device 14 that is connected to that Adapter 18. In the system 4 ii configuration of the present invention, however, each binding of a Processor 12 to an Adapter 18 must result in the identification by the Processor 12 of up to four separate Disk Devices 14.

Figure 2:
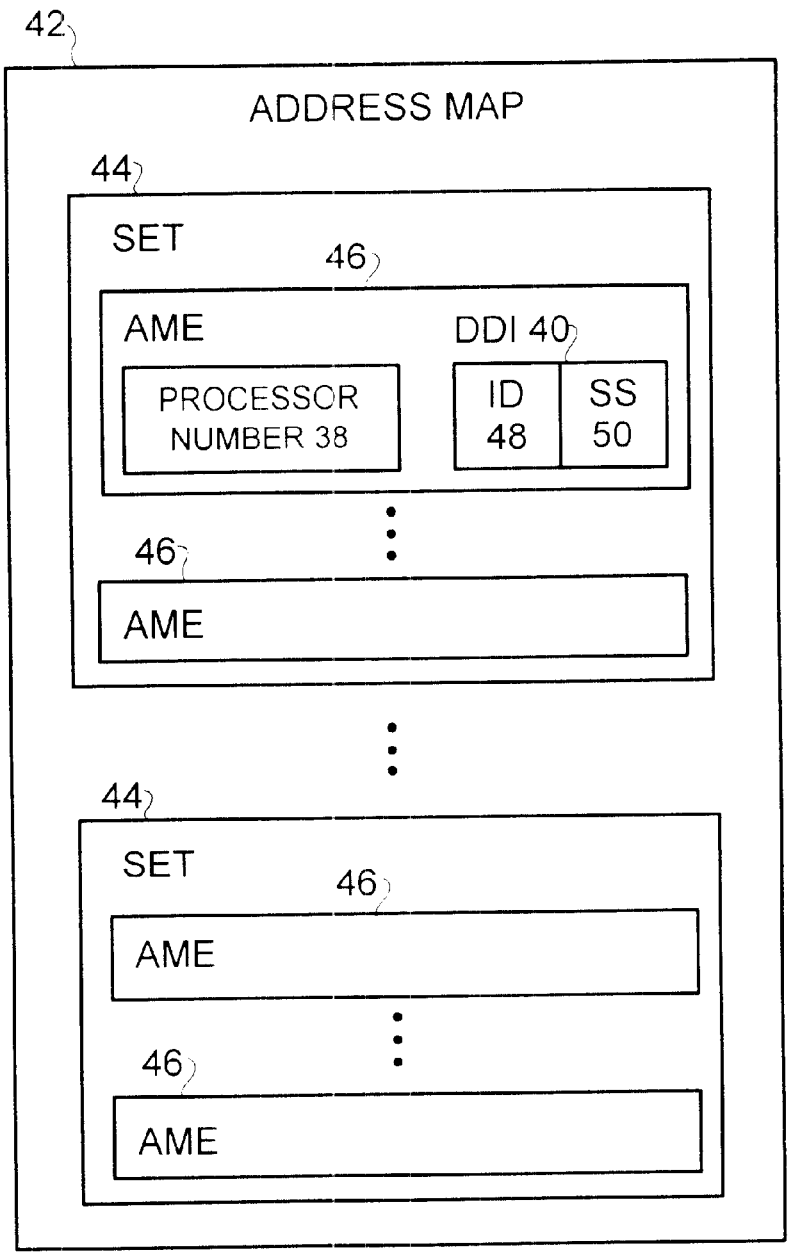

For these reasons, a MP/MDD System 10 of the present invention further includes an Address Mapper 34 and Binding Mapper 36 wherein, in the present embodiment, Address Mapper 34 is incorporated into the Operating System Device Driver Stack (DDS) 26A and references Binding Mapper 36. As shown in FIGS. 1 and 2, Address Mapper 34 communicates with OS 26 and A/DDC 28 to translate Processor Disk Device (PDD) Names 38 into corresponding Disk Device 14 Identifications (DDIs) 40 as understood by Adapters 18. For this purpose, Address Mapper 34 maintains an Address Map 42 containing a Processor Set (Set) 44 of Address Map Entries (AMEs) 46 for each of Disk Drives 14 wherein each AME 46 of a given Set 44 corresponds to a Processor 12 of the System 10 is indexed by a corresponding Processor Name 38 identifying a corresponding Processor 12 and contains a DDI 40. The specific form of DDI 40 will depend upon the needs and capabilities of the specific A/DDC 28, and the interactions of A/DDC 28 with Switch 22. In general, however, and as represented in FIG. 2, each DDI 40 will be contain a Disk Identifier (ID) 48 corresponding to the optimal path of access to the corresponding Disk Drive 14, and may optionally include a Switch State (SS) 50. An ID 48 will comprise a "name" of a Disk Device 14 as recognized by an Adapter 18, thereby allowing an Adapter 18 to communicate with the corresponding Disk Device 14, and a Switch State (SS) 50 will identify a connection to be made by Switch 22 between the Adapter 18 and the identified Disk Device 14. In some implementations, for example, A/DDC 28 will accept both an ID 48 and a SS 50 and will control both the Adapter 18 and Switch 22 accordingly to establish the appropriate connection through Switch 22 and the communication between the Processor 12 and the Disk Device 14. In other implementations, the ID 48 alone will be provided to A/DDC 28 to control communications between the Processor 12 and the identified Disk Device 14 through the Adapter 18. In this respect, it must be noted that a Switch 22 is typically predominately self selecting, that is, self controlling, and it is accordingly not necessary to provide information to the Switch 22 to inform the Switch 22 as to which connection is to be made between an Adapter 18 and a Disk Device 14 through Adapter Ports 20 and Device Ports 24.

Binding Mapper 36, in turn, communicates and operating in conjunction with Binding 30 and Address Mapper 34 at each binding of Adapters 18 and Disk Devices 14 to Processors 12, such as at system initialization or configuration, to establish the binding relationships between Processors 12 and Adapters 18 and the relationships between Processors 12 and Disk Devices 14 and to construct Address Map 42. Binding Mapper 36 does so by communicating with Binding 30 at each binding of the Adapaters 18 and Processors 12 and, at each binding of a Processor 12/Adapter 18 pair, enumerating the connected Disk Drives 14 with which the Processor 12 of the Processor 12/Adapter 18 pair is to communicate. As described, Binding 30 operates with Processors 12, and OS 26, to bind each Processor 12 to a single Adapter 18. As has also been described, however, at each such binding the Processor 12 and its associated Adapter 18 must determine and identify the Processor Number 38, the ID 48 and the SS 50 for each Disk Device 14 to which the Processor 12 is to have access. For this purpose, Binding Mapper 36 will generate a succession of SS 50s during each binding of a Processor 12 to an Adapter 18 wherein each SS 50 corresponds to a connection between the Adapter 18's AP 20 and a DP 24 and thereby to a Disk Device 14. Address Mapper 34 will provide each such SS 50 to Switch 22, or to Switch 22 through A/DDC 28, depending upon the functions and capabilities of A/DDC 28, to establish the corresponding connections in turn between the Processor 12 and each Disk Device 14 through the Adapter 18 and Switch 22. The Processor 12 and Adapter 18 will determine the corresponding Processor Numbers 38 and DDIs 48 for each SS 50, that is, each connection of the Processor 12 and Adapter 18 to a Disk Device 14 and will provide the Processor Numbers 38 and DDIs 48 to Address Mapper 34. Address Mapper 34, in turn, will use the Processor Numbers 38, IDs 48 and SS 50s determined for each binding of a Processor 12 to an Adapter 18 to construct the corresponding Processor Set (Set) 44 of Address Map Entries (AMEs) 46. In this regard, it will be noted that in the presently preferred embodiment Binding Mapper 36 will interact with Binding 30 to maintain Binding 30 in the binding operation for a Processor 12/Adapter 18 until the Set 44 of AMEs 46 for the Processor 12/Adapter 18 is completed.

Finally, upon completion of Address Map 42 the MP/MDD System 10 is ready for normal operation. Processors 12 will request accesses to Disk Devices 14 by the submission of read/write access requests to their corresponding bound Adapters 18 wherein each such request by a Processor 12 will contain the Processor Name 38 of the Processor 12 submitting the request and a reference to a Disk Drive 14; In each instance, Address Mapper 34 will use the Processor Name 38 to index the Set 44 corresponding to that Processor 12 and will read the AME 46 identified by the Processor Name 38 to obtain the ID 40 and SS 50 of the identified AME 46, thereby identifying the optimumal path of access to the corresponding Disk Drive 14. This information will be returned to the requesting Processor 12, which will provide the ID 48 to the Adapter 18, to identify to the Adapter 18 the corresponding Disk Device 14 that is the target of the request, so that the requested operation can be completed.

Lastly, the structure and operation of Address Mapper 34 and Binding Mapper 36 are further described in the attached Appendices A and B, which are exemplary program listing of, respectively, Address Mapper 34 and Binding Mapper 36 for use in a quad processor Intel SMP system executing the Microsoft NT operating system.

While the invention has been particularly shown and described with reference to preferred embodiments of the apparatus and methods thereof, it will be also understood by those of ordinary skill in the art that various changes, variations and modifications in form, details and implementation may be made therein without departing from the spirit and scope of the invention as defined by the appended claims. For example, the present invention may be implemented in systems having different numbers of disk drive devices and processors, in systems having multiple disk drives in each disk drive device, and in systems having different configurations of processors and processor complexes. The present invention may also be implemented in systems using mass storage devices other than disk drives, such as memories, optical disk units, and other devices providing comparable storage functions. Therefore, it is the object of the appended claims to cover all such variation and modifications of the invention as come within the true spirit and scope of the invention.

APPENDIX A

```
/*
    Bindtool
    This tool reads from standard input expecting the results of an
    "intbind-g" command. The input is parsed looking for lines
    containing "ScsiPortx". For each ScsiPort device found, its
    correlating processor is identified by an IOCTL call to the
    DGFCIOSMP driver. A batch file is created that when run will
    call intbind once for each ScsiPort interrupt vector, mapping
    it to the processor identified by DGFCIOSMP.
    Author: Michael Ryan
*/
#define DGFCIO_COMMAND_C
#include <stdio.h>
#include <errno.h>
#include <string.h>
#include <windows.h>
#include <winioctl.h>
#include "dgfcio_ioctl.h"
#define     LINELEN         256
#define     PROC0MASK       0x00000001
char    *portstr = "ScsiPort";
char    *devname = "\\\\.\\FcioControl";
char    *outfilename = "intcmd.bat";
void
main( )
{
    char            line[LINELEN];
    char            *portstrptr;
    char            *vectortok;
    HANDLE          sp_fd;
    long            rc = 0;
    long            *mapbuffer;
    unsigned long bytes_out;
    long            buffersize = 100 * sizeof(long);
    long            port;
    FILE            *outfile;
    long            processor;
    unsigned long procmask;
//
// Open dgfcio control devices and output file.
//
    sp_fd = CreateFile(devname,
            GENERIC_READ | GENERIC_WRITE,
            FILE_SHARE_READ | FILE_SHARE_WRITE,
            NULL, OPEN_EXISTING,
            FILE_ATTRIBUTE_NORMAL, NULL);
    if (sp_fd = = INVALID_HANDLE_VALUE) {
        rc = GetLastError( );
        printf("Error opening %s: rc = 0x%08x\n", devname, rc);
        exit(rc);
    }
    if ((outfile = fopen(outfilename, "w")) = = NULL) {
        rc = GetLastError( );
        printf("Error opening %s: rc = 0x%08x\n", outfilename, rc);
        exit(rc);
        CloseHandle(sp_fd);
    }
```

APPENDIX A-continued

```
//
// Retrieve ScsiPort to processor mapping from dgfcio.sys
//
try_again:
    mapbuffer = (long int*)malloc(buffersize);
    if (!DeviceIoControl(sp_fd, IOCTL_DGFCIO_INT_MAP,
            NULL, 0, mapbuffer, buffersize, &bytes_out,
            NULL)) {
        rc = GetLastError( );
        if ((rc = = ERROR_INVALID_PARAMETER) &&
            (buffersize < 1024 * 1024)) {
            free(mapbuffer);
            buffersize *= 2;
            goto try_again;
        }
        printf("IOCTL_DGFCIO_INT_MAP ioctl failed - %d\n", rc);
        exit(rc);
    }
//
// Read interrupt vector mapping from stdin. Write to output
// file commands to execute to map interrupt vectors to the
// appropriate processor.
//
    while (fgets(line, LINELEN, stdin) != NULL) {
        if ((portstrptr = strstr(line, portstr)) != NULL) {
            portstrptr += strlen(portstr);
            port = atoi(portstrptr);
            if (port > mapbuffer[0]) //error: port > numports
                continue;
            processor = mapbuffer[port + 1];
            procmask = PROC0MASK << processor;
            strtok(line, " ");
            strtok(NULL, " ");
            vectortok = strtok(NULL, " ");
            fprintf(outfile, "intbind -p %s %d\n", vectortok, procmask);
        }
    }
    free(mapbuffer);
    fclose(outfile);
    CloseHandle(sp_fd);
}
```

APPENDIX B

```
@echo off
REM
REM BindInterrupts is a simple batch program that coordinates
REM IntBind and Bindtool to bind ScsiPort interrupts to
REM processors based on the mapping established by DGFCIOSMP.
REM
REM Uncomment this line to show the status of interrupt bindings
REM prior to rebinding.
REM intbind -g
intbind -g > intbind.out
bindtool < intbind.out
call intcmd.bat
del intbind.out
del intcmd.bat
REM Uncomment this line to show the status of interrupt bindings
REM post rebinding.
REM intbind -g
```

What is claimed is:

1. In a computer system having a first plurality of processors, a second plurality of mass storage devices, a third plurality of adapters for providing communication between the processors and the mass storage devices, a binding mechanism for determining relationships between the processors and the adapters and a switch mechanism for establishing communication paths between the adapters and the mass storage devices, a mechanism for providing access between the processors and the mass storage devices, comprising:

a binding mapper communicating with the binding mechanism for determining the mass storage devices of the plurality of mass storage devices with which each processor is to communicate, and a device driver stack address mapper responsive to the binding mapper for constructing an address map, wherein the address map contains a processor set for each mass storage device wherein each processor set includes at least one address map entry for each processor that is to communicate with the corresponding mass storage device and each address map entry defines a communication path through an adapter and the switch between a processor and a mass storage device with which the processor is to communicate.

2. The mechanism for providing access between processors and mass storage devices of claim 1, wherein:

the address mapper is responsive to a request for access to a mass storage device by a processor by providing the corresponding address map entry from the processor set corresponding to the requesting processor, and the requesting processor is responsive to the corresponding address map entry by directing the request through the communication path through an adapter and the switch as determined by the corresponding address map entry.

3. In a computer system having a first plurality of processors, a second plurality of mass storage devices, a third plurality of adapters for providing communication between the processors and the mass storage devices, a binding mechanism for determining relationships between the processors and the adapters and a switch mechanism for establishing communication paths between the adapters and the mass storage devices, a method for providing access between the processors and the mass storage devices, comprising the steps of:

by operation of the binding mechanism, establishing relationships between the processors and the adapters, at each binding of a processor and adapter, determining by operation of a binding mapper the mass storage devices of the plurality of mass storage devices with which each processor is to communicate, and constructing an address map, wherein the address map contains a processor set for each mass storage device wherein each processor set includes at least one address map entry for each processor that is to communicate with the corresponding mass storage device and each address map entry defines a communication path through an adapter and the switch between a processor and a mass storage device with which the processor is to communicate.

4. The mechanism for providing assess between processors and mass storage devices of claim 3, further comprising the steps of:

in response to a request for access to a mass storage device by a processor, providing the corresponding address map entry from the processor set corresponding to the requesting processor, and in response to the corresponding address map entry, directing the request thought the communication path through an adapter and the switch as determined by the corresponding address map entry.

\* \* \* \* \*